(12) United States Patent
Leesch et al.

(10) Patent No.: US 8,425,370 B2
(45) Date of Patent: Apr. 23, 2013

(54) TRANSMISSION UNIT

(75) Inventors: Mirko Leesch, Thum (DE); Thomas Listner, Esslingen (DE); Jörg Müller, Chemnitz (DE); Rico Resch, Wilsdruff (DE); Klaus Riedl, Tübngen (DE)

(73) Assignee: Daimler AG, Stuttgart (DE)

( * ) Notice: Subject to any disclaimer, the term of this patent is extended or adjusted under 35 U.S.C. 154(b) by 135 days.

(21) Appl. No.: 13/068,105

(22) Filed: May 2, 2011

(65) Prior Publication Data
US 2011/0251014 A1 Oct. 13, 2011

Related U.S. Application Data

(63) Continuation-in-part of application No. PCT/EP2009/006956, filed on Sep. 26, 2009.

(30) Foreign Application Priority Data

Nov. 3, 2008 (DE) .......................... 10 2008 055 626

(51) Int. Cl.
*F16H 3/62* (2006.01)

(52) U.S. Cl.
USPC .......................... 475/276; 475/271; 475/330

(58) Field of Classification Search ........... 475/269–330
See application file for complete search history.

(56) References Cited

U.S. PATENT DOCUMENTS

| 2006/0014604 A1 | 1/2006 | Ziemer | |
| 2007/0213168 A1* | 9/2007 | Gumpoltsberger | 475/275 |
| 2009/0017979 A1* | 1/2009 | Phillips et al. | 475/282 |
| 2009/0209387 A1* | 8/2009 | Phillips et al. | 475/275 |

* cited by examiner

*Primary Examiner* — Justin Holmes
(74) *Attorney, Agent, or Firm* — Klaus J. Bach (57) ABSTRACT

In a transmission, particularly a motor vehicle transmission, having a first, a second, a third, and a fourth planetary gear unit disposed along a main axis of rotation and having six clutch units providing for nine forward gears to be engaged, a drive unit is connected for rotation with a sun gear of the second planetary gear unit and a fourth planetary carrier of the fourth planetary gear transmission and further a power output unit is rotationally fixedly connected to a third planetary carrier of the third planetary gear unit.

14 Claims, 3 Drawing Sheets

|     | S1a | S5a | S2a | S6a | S3a | S4a |
|-----|-----|-----|-----|-----|-----|-----|
| V1a |     | ●   | ●   |     |     | ●   |
| V2a |     | ●   |     |     | ●   | ●   |
| V3a |     | ●   | ●   |     | ●   |     |
| V4a |     | ●   | ●   | ●   |     |     |
| V5a |     |     | ●   | ●   | ●   |     |
| V6a |     |     |     | ●   | ●   | ●   |
| V7a |     |     | ●   | ●   |     | ●   |
| V8a | ●   |     |     | ●   |     | ●   |
| V9a | ●   |     | ●   | ●   |     |     |
| R1a | ●   | ●   | ●   |     |     |     |

Fig. 3

|     | V2a | V3a | V4a | V5a | V6a | V7a | V8a | V9a |
|-----|-----|-----|-----|-----|-----|-----|-----|-----|
| V1a | ✓   | ✓   | ✓   | ✗   | ✗   | ✓   | ✗   | ✗   |
| V2a |     | ✓   | ✗   | ✗   | ✓   | ✗   | ✗   | ✗   |
| V3a |     |     | ✓   | ✓   | ✗   | ✗   | ✗   | ✗   |
| V4a |     |     |     | ✓   | ✗   | ✓   | ✗   | ✓   |
| V5a |     |     |     |     | ✓   | ✓   | ✗   | ✓   |
| V6a |     |     |     |     |     | ✓   | ✓   | ✗   |
| V7a |     |     |     |     |     |     | ✓   | ✓   |
| V8a |     |     |     |     |     |     |     | ✓   |

|     | S1b | S5b | S2b | S6b | S3b | S4b |
|-----|-----|-----|-----|-----|-----|-----|
| V1b |     | ●   | ●   |     |     | ●   |
| V2b |     | ●   |     |     | ●   | ●   |
| V3b |     | ●   | ●   |     | ●   |     |
| V4b |     | ●   | ●   | ●   |     |     |
| V5b |     |     | ●   | ●   | ●   |     |
| V6b |     |     |     | ●   | ●   | ●   |
| V7b |     |     | ●   | ●   |     | ●   |
| V8b | ●   |     |     | ●   |     | ●   |
| V9b | ●   |     | ●   | ●   |     |     |
| R1b | ●   | ●   | ●   |     |     |     |

Fig. 6

TRANSMISSION UNIT

This is a Continuation-In-Part application of pending international patent application PCT/EP2009/006956 filed Aug. 26, 2009 and claiming the priority of German patent application 10 2008 055 626.2 filed Nov. 3, 2008.

BACKGROUND OF THE INVENTION

The invention relates to a transmission unit for a power train of a motor vehicle including four planetary gear units and six clutch units. It is the principal object to of the invention provide a compact transmission unit with a high number of forward transmission gears.

SUMMARY OF THE INVENTION

In a transmission, particularly a motor vehicle transmission, having a first, a second, a third, and a fourth planetary gear unit disposed along a main axis of rotation and having six clutch units providing for nine forward gears to be engaged, a drive unit is connected for rotation with a sun gear of the second planetary gear unit and a fourth planetary carrier of the fourth planetary gear unit and further a power output unit is rotationally fixedly connected to a third planetary carrier of the third planetary gear unit.

A transmission unit of compact design can be provided thereby, which also has a large number of gears with good stepping and sufficient spread.

A "clutch unit" is particularly meant to be a clutch unit and also a brake unit. A "clutch unit" is particularly meant to be a unit which is provided to optionally connect or to separate two clutch elements arranged rotationally in a rotationally fixed manner. A "brake unit" is particularly meant to be a unit which is provided to optionaly connect or separate a rotational clutch element to a fixed unit, particularly a transmission housing, in a rotationally fixed manner.

"A first, a second, a third and a fourth planetary gear unit, which are arranged along a main axis of rotation sequentially" are meant to be in this connection particularly a sequence of four planetary gear units, which are arranged along the main axis of rotation in this sequence, wherein the first planetary gear unit is advantageously facing the drive shaft. For simplification, a "first to fourth planetary wheel carrier", a "first to fourth sun wheel" and a "first to fourth hollow wheel" shall be meant to be a planetary wheel carrier or a sun wheel or a hollow wheel assigned to the first to fourth planetary gear unit, that is for example that the first planetary wheel carrier is meant to be a planetary wheel carrier of the first planetary gear unit.

Advantageously, at least one of the clutch units is provided to block at least one of the planetary gear units. One of the clutch units is particularly preferred provided to block the second planetary gear unit. A "blocked planetary gear unit" is meant to be a planetary gear unit where the sun wheel, the planetary wheel carrier and the hollow wheel are connected to each other in a rotationally fixed manner. A "blocking of a planetary gear unit" is particularly meant to be that at least two transmission elements of the planetary gear unit are connected to each other in a rotationally fixed manner, wherein the transmission elements are meant to be the sun wheel, the hollow wheel and the planetary wheel carrier. In order to block a planetary wheel carrier, it is basically also conceivable to connected the planetary wheel carrier to planetary wheels guided by the planetary wheel carrier in a rotationally fixed manner, whereby the transmission elements are also connected to each other in a rotationally fixed manner.

Two exemplary embodiments of the invention will be described below with reference to the accompanying drawings.

BRIEF DESCRIPTION OF THE DRAWINGS

It is shown in.

DESCRIPTION OF EXEMPLARY EMBODIMENTS

Figure 1:
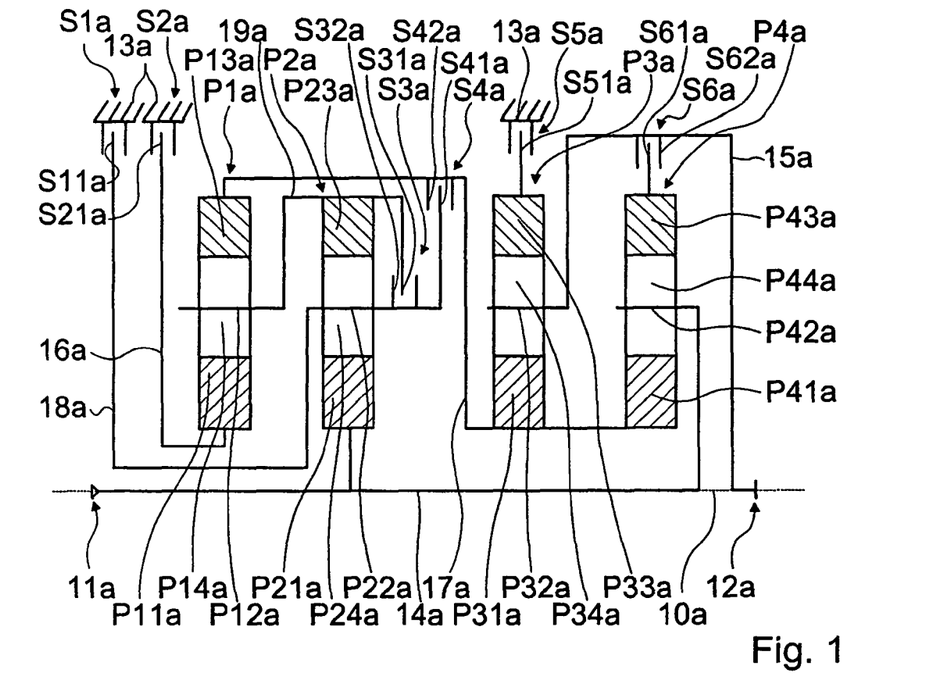
FIG. 1 a schematic depiction of the transmission according to the invention,
FIG. 2 exemplary transmission ratios for forward transmission gears of the transmission of FIG. 1,
FIG. 3 a shift logic of the transmission of FIG. 1,
FIG. 4 a shiftability of the transmission of FIG. 1,
FIG. 5 an alternatively designed transmission and in
FIG. 6 a shift logic of the transmission of FIG. 5.

FIG. 1 shows a transmission designed as a motor vehicle transmission. The transmission has four planetary gear units P1a, P2a, P3a, P4a. The first planetary gear unit P1a, the second planetary gear unit P2a, the third planetary gera unit P3a and the fourth planetary gear unit P4a are arranged behind one another along a main axis of rotation 10a. All planetary gear units P1a, P2a, P3a, P4a of the transmission have a single planetary wheel set. The transmission has six clutch units S1a, S2a, S3a, S4a, S5a, S6a. These are provided to shift exactly nine forward transmission gears V1a, V2a, V3a, V4a, V5a, V6a, V7a, V8a, V9a. The transmission can however also be operated with only eight forward transmission gears, for example in that the first forward transmission gear V1a or the ninth forward transmission gear V9a is not shifted.

The transmission is provided to connect a drive engine of a motor vehicle, not shown in detail, to drive wheels of the motor vehicle, not shown in detail. A transmission ratio between the drive engine and the drive wheels can be adjusted by means of the transmission. The transmission can be connected to a hybrid drive module, by means of which the drive torque can be changed. Furthermore, a CVT can be realized by means of the hybrid drive module and the transmission, whereby a transmission can be realized, whose transmission ratio can be adjusted in a stepless manner at least in partial regions.

The transmission has a drive unit 11a, which is provided to introduce a drive torque into the transmission. A module, not shown in detail, can be connected upstream of the drive unit 11a, which module shall be provided in particular to provide a start-up functionality. A transducer or a wet start-up clutch is for example conceivable as a module that is connected upstream. The module provided for the start-up can basically also be integrated into the transmission or one of the clutch units S1a, S2a, S3a, S4a, S5a, S6a can for example be used for the start-up.

The transmission further has a power output 12a, which is provided to divert In a transmission, particularly a motor vehicle transmission, having a first, a second, a third, and a fourth planetary gear unit disposed along a main axis of rotation and having six clutch units providing for nine forward gears to be engaged, a drive unit is connected for rotation with a sun gear of the second planetary gear unit and a fourth planetary carrier of the fourth planetary gear transmission and further a power output unit is rotationally fixedly connected to a third planetary carrier of the third planetary gear unit.a drive torque from the transmission. The power output 12a is provided to be connected to drive wheels of the motor vehicle. A module, not shown in detail, can be connected downstream of the power output 12a, by means of which module the torque diverted from the transmission can be distributed to the drive wheels, as for example a differential gear transmission which is provided for a speed compensation between the drive wheels, or an all wheel drive unit, which distributes the drive torque to two different drive axles. The drive unit 11a and the power output 12a can basically be arranged relative to each other in an arbitrary manner. A coaxial arrangement on opposite sides of the transmission is thereby particularly advantageous. An arrangement on the same side of the transmission unit is however also conceivable.

The first planetary gear unit P1a is arranged on the input side. The first planetary gear unit P1a has a single planetary wheel set. The single planetary wheel set comprises a first sun wheel P11a, a first hollow wheel P13a and a first planetary wheel carrier P12a. The planetary wheel carrier P12a carries planetary wheels P14a on a circular path. The planetary wheels P14a cog with the sun wheel P11a and with the hollow wheel 13a. The planetary wheels are mounted rotatably on the planetary wheel carrier P12a. The first planetary gear transmission P1a has a transmission ratio of −1.970 between the sun wheel P11a and the hollow wheel P13a with a fixed planetary wheel carrier P12a.

The second planetary gear unit P2a is arranged centrally on the input side. The second planetary gear unit P2a has a single planetary wheel set. The single planetary wheel set comprises a second sun wheel P21a, a second hollow wheel P23a and a second planetary wheel carrier P22a. The planetary wheel carrier P22a carries planetary wheels P24a on a circular path. The planetary wheels P24a cog with the sun wheel P21a and with the hollow wheel P23a. The planetary wheels are mounted rotatably on the planetary wheel carrier P22a. The second planetary gear unit P2a has a transmission ratio of −1.658 between the sun wheel P21a and the hollow wheel P23a with a fixed planetary wheel carrier P22a.

The third planetary gear unit P3a is arranged centrally on the output side. The third planetary gear unit P3a has a single planetary wheel set. The single planetary wheel set comprises a third sun wheel P31a, a third hollow wheel P33a and a third planetary wheel carrier P32a. The planetary wheel carrier P32a guides planetary wheels P34a on a circular path. The planetary wheels P34a cog with the sun wheel P31a and with the hollow wheel P33a. The planetary wheels are mounted rotatably on the planetary wheel carrier P32a. The third planetary gear unit P3a has a transmission ratio of −2.548 between the sun wheel P31a and the hollow wheel P33a with a fixed planetary wheel carrier P32a.

The fourth planetary gear unit P4a is arranged on the output side. The fourth planetary gear unit P4a has a single planetary wheel set. The single planetary wheel set comprises a fourth sun wheel P41a, a fourth hollow wheel P43a and a fourth planetary wheel carrier P42a. The planetary wheel carrier P42a guides planetary wheels P44a on a circular path. The planetary wheels P44a cog with the sun wheel P41a and with the hollow wheel P43a. The planetary wheels P44a are mounted rotatably on the planetary wheel carrier P42a. The fourth planetary gear unit P43a has a standing transmission ratio of −2.648 between the sun wheel P41a and the hollow wheel P43a with a fixed planetary wheel carrier P42a.

The three clutch units S3a, S4a, S6a are formed as clutch units. They respectively have a first rotatable clutch element S31a, S41a, S61a and a second rotatable clutch element S32a, S42a, S62a. The three clutch units S3a, S4a, S6a are respectively provided to connect their two clutch elements S31a, S32a, S41a, S42a, S61a, S62a in a rotationally fixed manner.

The three clutch units S1a, S2a, S5a are formed as brake units and respectively only have one clutch element S11a, S21a, S51a. The clutch units S1a, S2a, S5a are respectively provided to connect their clutch element S11a, S21a, S51a to a transmission housing in a rotationally fixed manner.

The clutch units S1a, S2a, S5a in the form of brake units are provided on the outside. The clutch units S3a, S4a, S6a in the form of clutch units are arranged on the inside. The clutch units S1a, S2a, S3a, S4a include disc packets. The clutch unit S5a is designed as a dog clutch unit. It has a synchronising unit, not shown in detail, which can basically also be omitted. The clutch unit S5a can however also be formed as a disc packet. The clutch units S1a, S2a are arranged in the axial direction at the input side from the first planetary gear unit P1a. The clutch units S3a, S4a are arranged in the axial direction between the second planetary gear unit P2a and the third planetary gear unit P3a. The clutch unit S5a is arranged in the axial direction at the height of the third planetary gear unit P3a. The clutch unit S6a is arranged in the axial direction at the height of the fourth planetary gear unit P4a.

The drive unit 11a is connected to the second sun wheel P21a and the fourth planetary wheel carrier P42a in a rotationally fixed manner by means of a drive shaft 14a which is connected to the drive unit 11a. The first sun wheel P11a and the clutch element S21a of the second clutch unit S2a are connected in a rotationally fixed manner by means of a connection shaft 16a. The first hollow wheel P13a, the clutch element S42a of the fourth clutch unit S4a, the third sun wheel P31a and the fourth sun wheel P41a are connected in a rotationally fixed manner by means of a connection shaft 17a. The clutch element S11a of the first clutch unit S1a, the second planetary wheel carrier P22a, the clutch element S32a of the third clutch unit S3a and the clutch element S41a of the fourth clutch unit S4a are connected in a rotationally fixed manner by means of a connection shaft 18a. The first planetary wheel carrier P12a, the second hollow wheel P23a and the clutch element S31 a of the third clutch unit S3 are connected in a rotationally fixed manner by means of a connection shaft 19a. The third hollow wheel P33a is directly connected to the clutch element S51a of the fifth clutch unit S5a in a rotationally fixed manner. The fourth hollow wheel P43a is directly connected to the clutch element S61 a of the sixth clutch unit S6a in a rotationally fixed manner. The power output unit 12a is connected in a rotationally fixed manner to the third planetary wheel carrier P32a and the clutch element S62a of the sixth clutch unit S6a by means of a power output shaft 15a.

The drive shaft 14a, which is connected to the drive unit 11a, passes through the four sun wheels P11a, P21a, P31a, P41a. The second hollow wheel P23a is directly connected to the drive shaft 14a. For the connection of the fourth planetary wheel carrier P42a, it is guided axially and radially between the fourth planetary gear transmission P4a and the power output shaft 15a. The connection shaft 16a is guided radially to the outside on the axial input side from the first planetary gear unit P1a. The connection shaft 17a surrounds the second planetary gear unit P2a. For the connection of the third sun wheel P31a and the fourth sun wheel P41a, it is guided radially and axially to the inside between the clutch unit S4a and the third planetary gear unit P3a. The connection shaft 18a is guided on the inputside to the outside by the connection shaft 16a. The connection shaft 18a limits the transmission unit on the input side. It further passes through the first sun wheel P11a and is guided to the outside radially and axially between the planetary gear units P1a, P2a for connecting the second planetary wheel carrier 22a. For the connection of the clutch element S42a, it passes through the second planetary gear unit P2a and is guided radially and axially to the outside between the connection shafts 17a, 19a. The connection shaft 19a is guided radially and axially to the outside between the first planetary gear transmission P1a and the second planetary gear unit P2a. At the output side of the second planetary gear unit P2a, the connection shaft 19a connects the clutch element S31a to the clutch unit S3a. The power output shaft 15a is guided axially and radially to the outside between the third planetary gear unit P3a and the fourth planetary gear unit P4a. It surrounds the fourth planetary gear unit P4a and limits the transmission unit on the output side.

Different hybrid drive modules can be combined by means of the transmission unit. A first drive machine of the hybrid drive module can be connected to the drive unit 11a or the drive shaft 14a for realizing a starter generator. For realizing a CVT, a further drive machine of the hybrid drive module can additionally be connected to an advantageous shaft of the transmission, as for example to the connection shaft 17a, which is connected to the third sun wheel P31a in a rotationally fixed manner.

Figure 3:
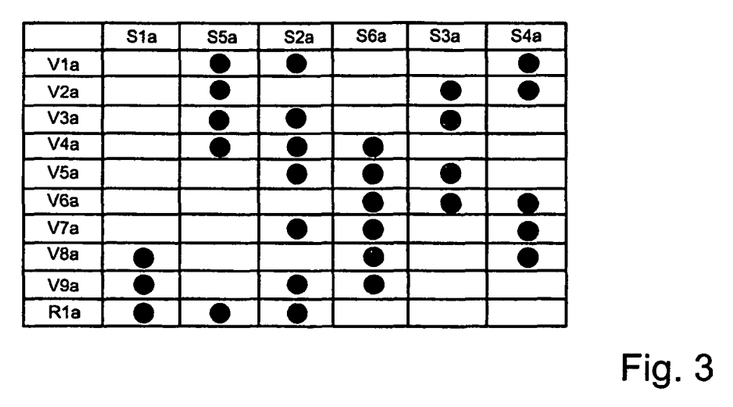

The forward transmission gears V1a-V9a are shifted by means of the clutch units S1a, S2a, S3a, S4a, S5a, S6a (see FIG. 3). In the forward transmission gears V1a-V9a described in the following, respectively at the most three of the clutch units S1a, S2a, S3a, S4a, S5a, S6a are closed, while the remaining clutch units S1a, S2a, S3a, S4a, S5a, S6a are opened. With a shift process from one of the forward transmission gears V1a-V9a, at the most respectively only two of the clutch units S1a, S2a, S3a, S4a, S5a, S6a are changed. With every shift process from one of the forward transmission gears V1a-V9a into an adjacent forward transverse transmission gear V1a-V9a, respectively two clutch units S1a, S2a, S3a, S4a, S5a, S6a which are already closed remain closed.

The second hollow wheel P23a and the second planetary wheel carrier can be connected in a rotationally fixed manner by means of the clutch unit S3a, whereby the second planetary gear transmission P2a can be blocked by means of the clutch unit S3a. The first planetary wheel carrier P12a and the second hollow wheel P23a and the first hollow wheel P13a and the second planetary wheel carrier P22 can be connected in a rotationally fixed manner by means of the clutch units S3a, S4a. As the second planetary gear transmission P2a is blocked in this case, the first planetary gear transmission is thereby also blocked and connected in a rotationally fixed manner to the second planetary gear transmission P2a.

The first forward transmission gear V1a has a transmission ratio $i_1a$ of 5.525 between the drive unit 11a and the power output unit in this embodiment. The first forward transmission gear V1a is formed by closing the clutch units S2a, S4a, S5a. The clutch unit S2a connects the first sun wheel P11a to the transmission housing 13a in a rotationally fixed manner. The clutch unit S4a connects the second planetary wheel carrier P22a to the first hollow wheel P13a and the third sun wheel P31a in a rotationally fixed manner. The clutch unit S5a connects the third hollow wheel P33a to the transmission housing 13a in a rotationally fixed manner.

The second sun wheel P21a rotates with a same speed as the drive unit 11a. The second planetary wheel carrier P22a rotates with a same speed as the first hollow wheel P13a. The second hollow wheel P23a rotates with a same speed as the first hollow wheel P12a. As the first sun wheel P11a is fixed, a speed ratio between the first planetary wheel carrier P12a and the first sun wheel P11a is defined by means of the standing transmission ratio of the first planetary gear transmission P1a, whereby a speed ratio between the second hollow wheel P23a and the second planetary wheel carrier P22a is also defined. A speed of the second planetary wheel carrier P22a is thus defined by the speed of the second sun wheel P21a and the standing transmission ratio of the first planetary gear unit P1a. The third sun wheel P31a has the same speed as the second planetary wheel carrier P22a. As the third hollow wheel P33a is fixed, a speed of the third planetary wheel carrier P32a is defined by the speed of the third sun wheel P31a and the standing transmission ratio of the third planetary gear unit P3a. The power output unit 12a has the same speed as the second planetary wheel carrier P22a. A power flow for the first transmission gear V1an is introduced via the second planetary gear unit P2a and split via the clutch unit S4a. A part of the power flow is fed back to the second planetary gear unit P2a via the first planetary gear transmission P1a. A further part of the power flow is diverted via the third planetary gear transmission P3a.

The second forward transmission gear V2a has a transmission ratio $i_2a$ of 3.548 between the drive unit 11a and the power output unit 12a in this embodiment. The second forward transmission gear V2a is formed by closing the clutch units S3a, S4a, S5a. The clutch unit S3a connects the second planetary wheel carrier P22a to the second hollow wheel P23a and the first planetary wheel carrier P12a in a rotationally fixed manner. The clutch unit S4a connects the second planetary wheel carrier P22a to the third sun wheel P31a in a rotationally fixed manner. The clutch unit S5a connects the third hollow wheel P33a to the transmission housing 13a in a rotationally fixed manner.

As the second planetary wheel carrier P22a is connected to the second hollow wheel P23a in a rotationally fixed manner, the second planetary gear unit P2a is blocked. The second planetary wheel carrier P22a thus has a same speed as the drive unit 11a. As the second planetary wheel carrier P22a is connected to the third sun wheel P31a in a rotationally fixed manner, the third sun wheel P31a also has the same speed as the drive unit 11a. The third hollow wheel P33a is fixed, whereby the speed of the drive unit 11a and the standing transmission ratio of the third planetary gear transmission P3a is defined. The power output unit 12a has the same speed as the third planetary wheel carrier P32a. A power flow for the second forward transmission gear V2a is introduced via the second planetary gear unit P2a and is diverted via the third planetary gear unit P3a.

The third forward transmission gear V3a has a transmission ratio $i_3a$ of 2.355 between the drive unit 11a and the power output unit 12a in this embodiment. The third forward transmission gear V3a is formed by closing the clutch units S2a, S3a, S5a. The clutch unit S2a connects the first sun wheel P11a to the transmission housing 13a in a rotationally fixed manner. The clutch unit S3a connects the second planetary wheel carrier P22a to the second hollow wheel P23a and the first planetary wheel carrier P12a in a rotationally fixed manner. The clutch unit S5a connects the third hollow wheel P33a to the transmission housing 13a in a rotationally fixed manner.

The second sun wheel P21a has a same speed as the drive unit 11a. As the second planetary gear unit P2a is blocked, the first planetary wheel carrier P12a, which is connected to the second hollow wheel P23a in a rotationally fixed manner, also has the same speed as the drive unit 11a. As the first sun wheel P11a is fixed, a speed of the first hollow wheel P13a is defined by the speed of the drive unit 11a and the standing transmission ratio of the first planetary gear unit P1a. The third sun wheel P31a is connected to the first hollow wheel P13a in a rotationally fixed manner and thus has the same speed as the first hollow wheel P13a. The third hollow wheel P33a is fixed, whereby a speed of the third planetary wheel carrier P32a, which is connected to the power output unit P11a in a rotationally fixed manner, is defined by the standing transmission ratio of the third planetary gear unit P3a and the speed of the third sun wheel P31a. A power flow for the third forward transmission gear V3a is introduced via the second planetary gear unit P2a, guided further via the first planetary gear unit P1a and is diverted again via the third planetary gear unit P3a.

The fourth forward transmission gear V4a has a transmission ratio $i_4a$ of 1.698 between the drive unit 11 a and the power output unit 12a in this embodiment. The fourth forward transmission gear V4a is formed by closing the clutch units S2a, S5a, S6a. The clutch unit S2a connects the first sun wheel P11a to the transmission housing 13a in a rotationally fixed manner. The clutch unit S5a connects the third hollow wheel P33a to the transmission housing 13a in a rotationally fixed manner. The clutch unit S6a connects the fourth hollow wheel P43a to the power output unit 12a in a rotationally fixed manner.

The fourth planetary wheel carrier P42a rotates with the same speed as the drive unit 11a. The fourth sun wheel P41a is connected to the third sun wheel P31a in a rotationally fixed manner. The fourth hollow wheel P43a is connected to the third planetary wheel carrier P32a in a rotationally fixed manner. As the third hollow wheel P33a is fixed, a speed ratio between the third sun wheel P31a and the third planetary wheel carrier P32a, which is the same as a speed ratio between the fourth sun wheel P41a and the fourth hollow wheel P43a, is defined by means of the standing transmission ratio of the third planetary gear unit P3a. A speed of the power output unit 12a, which is the same as the speed of the fourth hollow wheel P43a, is thus defined by the standing transmission ratio of the fourth planetary gear unit P4a, the speed ratio between the fourth sun wheel P41a and the fourth hollow wheel P43a and the speed of the drive unit 11a. A power flow for the fourth forward transmission gear V4a is introduced via the fourth planetary gear unit and split via the clutch unit S6a. A part of the power flow is fed back to the fourth planetary gear unit P4a via the third planetary gear unit P3a. A further part of the power flow is diverted directly.

The fifth forward transmission gear V5a has a transmission ratio $i_5a$ of 1.236 between the drive unit 11a and the power output unit 12a in this embodiment. The fifth forward transmission gear V5a is formed by closing the clutch units S2a, S3a, S6a. The clutch unit S2a connects the first sun wheel P11a to the transmission housing 13a in a rotationally fixed manner. The clutch unit S3a connects the second planetary wheel carrier P22a to the second hollow wheel P23a and the first planetary wheel carrier P12a in a rotationally fixed manner. The clutch unit S6a connects the fourth hollow wheel P43a to the power output unit 12a in a rotationally fixed manner.

The second sun wheel P21a P21a has a same speed as the drive unit 11a. As the the second planetary wheel carrier P22a is connected to the second hollow wheel P23a in a rotationally fixed manner, the second planetary gear unit P2a is blocked, whereby the second planetary wheel carrier P22a and the second hollow wheel P23a also have the same speed as the drive unit 11a. The first sun wheel is fixed. The first planetary wheel carrier P12a, which is connected to the second hollow wheel P23a in a rotationally fixed manner, has the same speed as the drive unit 11a. A speed of the first hollow wheel P13a is thus defined by the standing transmission ratio of the first planetary gear unit P1a and the speed of the drive unit 11a. The fourth planetary wheel carrier P42a also has the same speed as the drive unit 11a. The fourth sun wheel P41a has the same speed as the first hollow wheel P13a. A speed of the fourth hollow wheel P43a, which is connected to the power output unit 12a in a rotationally fixed manner, is defined by means of the speed of the drive unit 11a, the speed of the fourth sun wheel P41a and the standing transmission ratio of the fourth planetary gear unit P4a. A power flow for the fifth transmission gear V5a is introduced via the fourth planetary gear unit P4a and is split. A part of the power flow is fed back to the drive unit 11a via the first planetary gear unit P1a and the second planetary gear unit P2a. A further part of the power flow is diverted again via the fourth planetary gear unit P4a.

The sixth forward transmission gear V6a has a transmission ratio $i_6a$ of 1.000 between the drive unit 11a and the power output 12a in this embodiment. It is formed as a direct gear. The sixth forward transmission gear V6a is formed by closing the clutch units S3a, S4a, S6a. The clutch unit S3a connects the second planetary wheel carrier P22a to the second hollow wheel P23a and the first planetary wheel carrier P12a in a rotationally fixed manner. The clutch unit S4a connects the second planetary wheel carrier P22a to the fourth sun wheel P41a in a rotationally fixed manner. The clutch unit S6a connects the fourth hollow wheel P43a to the power output 12a in a rotationally fixed manner.

As the second planetary wheel carrier P22a is connected to the second hollow wheel P23a in a rotationally fixed manner, the second planetary gear unit P2a is blocked. As the second sun wheel P21a has a same speed as the drive unit 11a, the second planetary wheel carrier P22a and the fourth sun wheel P41a also have the same speed as the drive unit 11a. The fourth planetary wheel carrier P42a, which is connected to the drive unit 11a in a rotationally fixed manner, also has the same speed as the drive unit 11a, whereby the fourth hollow wheel P43a also has the same speed as the drive unit 11a. A power flow for the sixth transmission gear V6a is introduced via the fourth planetary gear unit P4a and is split. A part of the power flow is fed back to the drive unit 11a via the second planetary gear unit P2a. A further part of the power flow is diverted again via the fourth planetary gear unit P4a.

The seventh forward transmission gear V7a has a transmission ratio $i_7a$ of 0.881 between the drive unit 11a and the power output 12a in this embodiment. The seventh forward transmission gear V7a is formed by closing the clutch units S2a, S4a, S6a. The clutch unit S2a connects the first sun wheel P11a to the transmission housing 13a in a rotationally fixed manner. The clutch unit S4a connects the second planetary wheel carrier P22a to the fourth sun wheel P41a in a rotationally fixed manner. The clutch unit S6a connects the fourth hollow wheel P43a to the power output 12a in a rotationally fixed manner.

As the first sun wheel P11a is fixed, a speed ratio between the first planetary wheel carrier P12a and the first hollow wheel P13a and thus also between the second hollow wheel P23a and the second planetary wheel carrier P22a by the standing transmission ratio of the first planetary gear unit P1a. A speed of the fourth sun wheel P41a, which is the same as a speed of the second hollow wheel P23a, is thus defined by the speed ratio between the first planetary wheel carrier P12a and the first hollow wheel P13a and a speed of the drive unit 11a. A speed of the fourth hollow wheel P43a is defined by the speed of the fourth sun wheel P41a, the speed of the drive unit 11a and the standing transmission ratio of the fourth planetary gear unit P4a. A power flow for the seventh forward transmission gear V7a is introduced via the fourth planetary gear unit P4a and is split. A part of the power flow is fed back to the drive unit 11a via the second planetary gear unit P2a and the first planetary gear unit P1a. A further part of the power flow is diverted via the fourth planetary gear unit P4a.

The eighth forward transmission gear V8a has a transmission ratio $i_8$a of 0.726 between the drive unit 11a and the power output 12a in this embodiment. The eighth forward transmission gear V8a is formed by closing the clutch units S1a, S4a, S6a. The clutch unit S1a connects the second planetary wheel carrier P22a to the transmission housing 13a in a rotationally fixed manner. The clutch unit S4a connects the fourth sun wheel P41a to the second planetary wheel carrier P22a and thus to the transmission housing 13a in a rotationally fixed manner. The clutch unit S6a connects the fourth hollow wheel P43a to the power output 12a in a rotationally fixed manner.

The fourth sun wheel P41a is fixed. The fourth planetary wheel carrier P42a, which is connected to the drive unit 11a in a rotationally fixed manner has a same speed as the drive unit 11a. A speed of the fourth hollow wheel P43a and thus a speed of the power output unit 12a are defined by the speed of the drive unit 11a and the standing transmission ratio of the fourth planetary gear unit P4a. A power flow for the eighth forward transmission gear V8 is introduced and diverted via the fourth planetary gear unit P4b.

The ninth forward transmission gear V9a has a transmission ratio $i_9$a of 0.581 between the drive unit 11a and the power output 12a in this embodiment. The ninth forward transmission gear V9b is formed by closing the clutch units S1a, S2a, S6a. The clutch unit S1a connects the second planetary wheel carrier P22a to the transmission housing 13a in a rotationally fixed manner. The clutch unit S2a connects the first sun wheel P11a to the transmission housing 13a in a rotationally fixed manner. The clutch unit S6a connects the fourth hollow wheel P43a to the power output 12a in a rotationally fixed manner.

The second planetary wheel carrier P22a is fixed. The second sun wheel P21a has a same speed as the drive unit 11a. A speed of the second hollow wheel P23a is defined by the speed of the drive unit 11a and the standing transmission ratio of the second planetary gear unit P2a. The first planetary wheel carrier P12a has the same speed as the second hollow wheel P23a. The first sun wheel P11a is fixed. A speed of the first hollow wheel P13a is defined by the speed of the second hollow wheel P23a and the standing transmission ratio of the first planetary gear unit P1a. The speed of the fourth sun wheel P41a is the same as the speed of the first hollow wheel P13a. The fourth hollow wheel P42a has a same speed as the drive unit 11a. A speed of the fourth hollow wheel P43a, which is connected to the power output 12a in a rotationally fixed manner, is defined by the speed of the second hollow wheel P23a, the standing transmission ratio of the fourth planetary gear unit P4a and the speed of the drive unit 11a. A power flow for the ninth forward transmission gear V9a introduced via drive unit 11a is split before the first planetary gear unit P1a. A first part of the power flow is guided to the fourth planetary gear unit P4a via the second planetary gear unit P2a and the first planetary gear unit P1a. A second part of the power flow is guided directly to the fourth planetary gear unit P4a. The power flow is combined again and diverted by means of the fourth planetary gear unit P4a.

The reverse transmission gear R1a has a transmission ratio $i_R$a of −3.905 between the drive unit 11b and the power output unit 12a in this embodiment. The reverse transmission gear R1a is formed by closing the clutch units S1a, S2a, S5a. The clutch unit S1a connects the second planetary wheel carrier P22a to the transmission housing 13a in a rotationally fixed manner. The clutch unit S2a connects the first sun wheel P11a to the transmission housing 13a in a rotationally fixed manner. The clutch unit S5a connects the third hollow wheel P33a to the transmission housing 13a in a rotationally fixed manner.

The second planetary wheel carrier P22a is fixed. The second sun wheel P21a has a same speed as the drive unit 11a. A speed of the second hollow wheel P23a is defined by the speed of the drive unit 11a and the standing transmission ratio of the second planetary gear unit P2a. The first planetary wheel carrier P12a has the same speed as the second hollow wheel P23a. The first sun wheel P11a is fixed. A speed of the first hollow wheel P13a is defined by the speed of the second hollow wheel P23a and the standing transmission ratio of the first planetary gear unit P1a. The speed of the third sun wheel P31a is the same as the speed of the first hollow wheel P13a. The third hollow wheel P33a is fixed. A speed of the third planetary wheel carrier P32a, which is connected to the power output 12a in a rotationally fixed manner, is defined by the speed of the first hollow wheel P13a and the standing transmission ratio of the third planetary gear unit P3a. A power flow for the reverse transmission gear R1a is introduced via the second planetary gear transmission P2a, guided to the third planetary gear unit P3a via the first planetary gear unit P1a, and is diverted again via the third planetary gear unit P3a.

Figure 2:
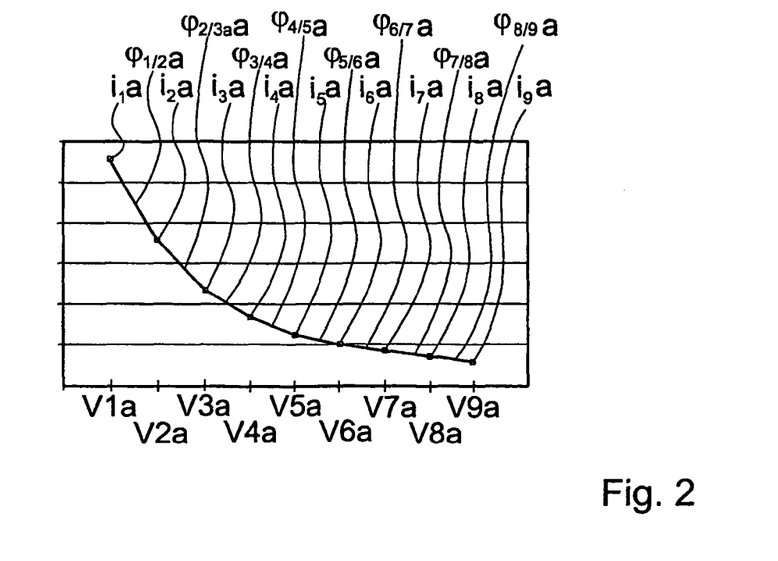

A progressive ratio $\phi_{1/2}$a between the first and the second forward transmission gear V1a, V2a is 1.557. A progressive ratio $\phi_{2/3}$a between the second and the third forward transmission gear V2a, V3a is 1.506. A progressive ratio $\phi_{3/4}$a between the third and the fourth forward transmission gear V3a, V4a is 1.387. A progressive ratio $\phi_{4/5}$a between the fourth and the fifth forward transmission gear V4a, V5a is 1.374. A progressive ratio $\phi_{5/6}$a between the fifth and the sixth forward transmission gear V5a, V6a is 1.236. A progressive ratio $\phi_{6/7}$a between the sixth and the seventh forward transmission gear V6a, V7a is 1.135. A progressive ratio $\phi_{7/8}$a between the seventh and the eighth forward transmission gear V7a, V8a is 1.214. A progressive ratio $\phi_{8/9}$a between the eighth and the ninth forward transmission gear V8a, V9a is 1.249. A total spread of the transmission unit between the first forward transmission gear V1a and the ninth forward transmission gear V9a is about 9.5. A spread between the first forward transmission gear V1a and the eighth forward transmission gear V8a is about 7.6. A spread between the second forward transmission gear V2a and the ninth forward transmission gear V9a is about 6.1 (see FIG. 2). The transmission unit can basically also be used as an eight gear transmission.

A maximum speed factor for the planetary gear unit P1a, P2a, P3a, P4a is about 2.7. A maximum speed factor for the planetary gear units P1a, P2a, P3a, P4a is about 3.3 in the forward transmission gear V9a. The speed factor for the planetary gear units P1a, P2a, P3a, P4a describes a ratio between a speed of the drive unit 11a and a maximum speed, which occurs at the sun wheels P11a, P21a, P31a, P41a, the hollow wheels P13a, P23a, P33a, P43a or the planetary wheel carriers P12a, P22a, P32a, P42a in one of the forward transmission gears V1a-V9a. A maximum speed factor for the planetary wheels P14a, P24a, P34a, P44a is about 3.0 in the forward transmission gears V1a-V8a and about 3.3 in the ninth forward transmission gear V9a. A maximum speed of the drive unit 11a and thus a speed of the planetary wheels P14a, P24a, P34a, P44a can be limited in the ninth forward transmission gear V9a.

A maximum torque factor is about 5.5 for the forward transmission gears V1a-V9a. The torque factor describes a ratio between between a drive torque applied at a drive unit 11a and a maximum torque occurring at the sun wheels P11a, P21a, P31a, P41a, the hollow wheels P13a, P23a, P33a, P43a or the planetary wheel carriers P12a, P22a, P32a, P42a. The maximum torque factor for the forward transmission gears V1a-V9a is achieved in the first forward transmission gear V1a.

Figure 4:
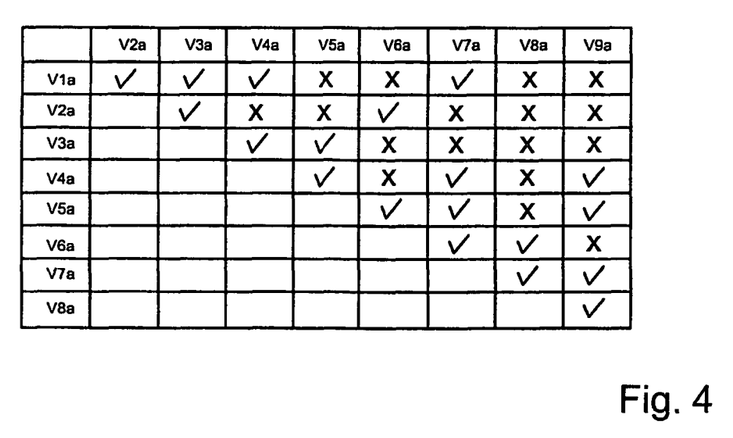

A shiftability of the forward transmission gears V1a-V9a is shown in FIG. 4. The forward transmission gears V2a, V3a, V4a, V7a can be shifted starting with the first forward transmission gear V1a. The forward transmission gears V1a, V3a, V6a can be shifted starting with the second forward transmission gear V2a. The forward transmission gears V1a, V2a, V4a, V5a can be shifted starting with the third forward transmission gear V3a. The forward transmission gears V4a, V5a, V7a, V9a can be shifted starting with the fourth forward transmission gear V4a. The forward transmission gears V3a, V4a, V6a, V7a, V9a can be shifted starting with the fifth forward transmission gear V5a. The forward transmission gears V2a, V5a, V7a, V8a can be shifted starting with the sixth forward transmission gear V6a. The forward transmission gears V1a, V4a, V5a, V6a, V8a, V9a can be shifted starting with the seventh forward transmission gear V7a. The forward transmission gears V6a, V7a, V9a can be shifted starting with the eighth forward transmission gear V8a. The forward transmission gears V4a, V5a, V7a, V8a can be shifted starting with the ninth forward transmission gear V9a.

Figure 5:
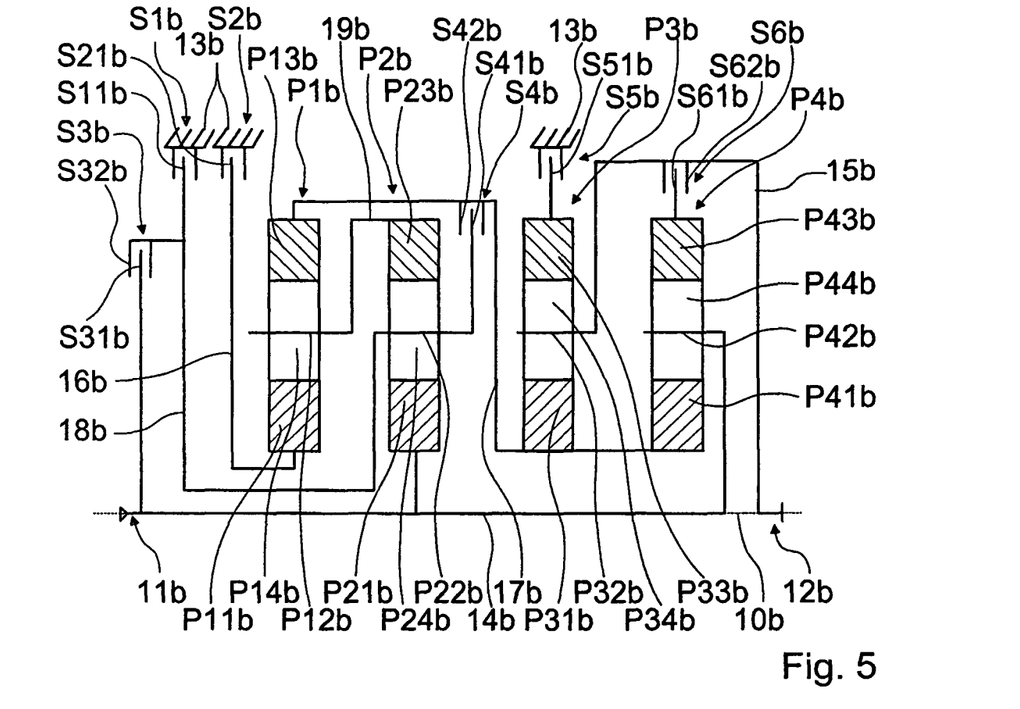
Figure 6:
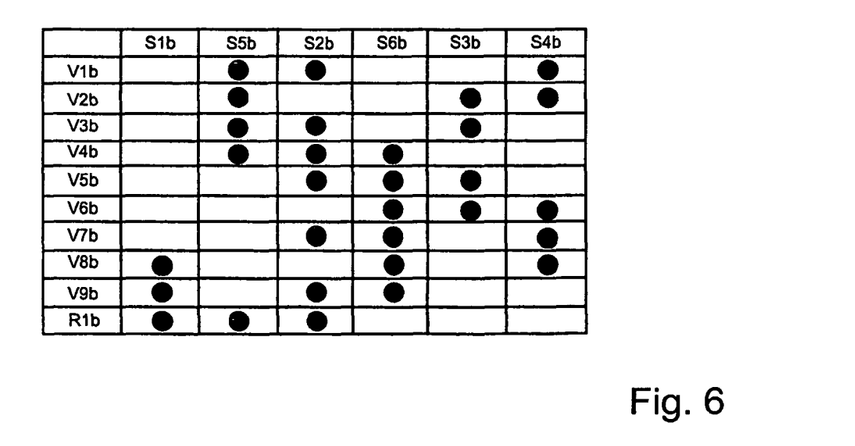

In FIGS. 5 to 6 is shown a further embodiment of the invention. For distinguishing the embodiments, the letter "a" is replaced in the reference numerals of the embodiment in FIGS. 1 and 4 by the letter b in the reference numerals of the embodiments in FIGS. 5 to 6. The following description is essentially restricted to differences between the embodiments. With regard to the same components, characteristics and functions, one can refer to the description and/or the drawings of the embodiment in FIGS. 1 to 4.

FIG. 5 shows a transmission designed as a motor vehicle transmission. The transmission has four planetary gear units P1b, P2b, P3b, P4b. The first planetary gear unit P1b, the second planetary gear unit P2b, the third planetary gear unit P3b and the fourth planetary gear unit P4b are arranged behind each other along a main axis of rotation 10b. The transmission has six clutch units S1b, S2b, S3b, S4b, S5b, S6b. These are provided to shift exactly nine forward transmission gears V1b, V2b, V3b, V4b, V5b, V6b, V7b, V8b, V9b. The transmission can however also be operated with only eight forward transmission gears, for example in that the first forward transmission gear V1b or the ninth forward transmission gear V9b is not shifted.

The first planetary gear unit P1b is arranged on the input side. The first planetary gear unit P1b has a single planetary wheel set. The single planetary wheel set comprises a first sun wheel P11b, a first hollow wheel P13b and a first planetary wheel carrier P12b. The first planetary gear unit P1b has a standing transmission ratio of −1.970 between the sun wheel P11b and the hollow wheel P13b with a fixed planetary wheel carrier P12b.

The second planetary gear unit P2b is arranged centrally on the input side. The second planetary gear unit P2b has a single planetary wheel set. The single planetary wheel set comprises a second sun wheel P21b, a second hollow wheel P23b and a second planetary wheel carrier P22b. The second planetary gear unit P2b has a standing transmission ratio of −1.654 between the sun wheel P21b and the hollow wheel P23b with a fixed planetary wheel carrier P22b.

The third planetary gear unit P3b is arranged centrally on the output side. The third planetary gear unit P3b has a single planetary wheel set. The single planetary wheel set comprises a third sun wheel P31b, a third hollow wheel P33b and a third planetary wheel carrier P32b. The third planetary gear unit P3b has a standing transmission ratio of −2.556 between the sun wheel P31b and the hollow wheel P33b with a fixed planetary wheel carrier P32b.

The fourth planetary unit P4b is arranged on the output side. The fourth planetary gear unit P4b has a single planetary wheel set. The single planetary wheel set comprises a fourth sun wheel P41b, a fourth hollow wheel P43b and a fourth planetary wheel carrier P42b. The fourth planetary gear unit P4b as a standing transmission ratio of −2.644 between the sun wheel P41b and the hollow wheel P43b with a fixed planetary wheel carrier P42b.

The three clutch units S3b, S4b, S6b formed as clutch units respectively have one first rotatable clutch element S31b, S41b, S61b and a second rotatable clutch element S32b, S42b, S62b which can be connected to each other in a rotationally fixed manner by means of the corresponding clutch units S3b, S4b, S6b. The three clutch units S1b, S2b, S5b formed as brake units respectively only have one clutch element S11b, S21b, S51b, which can be connected to a transmission housing 13b in a rotationally fixed manner by means of the corresponding clutch units S1b, S2b, S5b.

The clutch units S1b, S2b, S3b, S5b are arranged on the outside. The clutch units S4b, S6b are designed as lying on the inside. The clutch units S1b, S2b, S3b, S6b are in the form of disc packets. The clutch unit S5b is in the form of a dog clutch unit. It has a synchronising unit, not shown in detail, which can basically also be omitted. The clutch unit S5b can however also in the form of a disc packet. The clutch units S3b, S1b, S2b are arranged in the axial direction at the input side from the first planetary gear unit P1b in this sequence. The clutch unit S4b is arranged in the axial direction between the second planetary gear unit P2b and the third planetary gear unit P3b. The clutch unit S5b is arranged in the axial direction at the level of the fourth planetary gear unit P3b. The clutch unit S6b is arranged in the axial direction at the level of the fourth planetary gear unit P4b.

The drive unit 11b is connected to the second sun wheel P21b, the fourth planetary wheel carrier P42b and the first clutch element S31b of the third clutch unit S3b in a rotationally fixed manner by means of a drive shaft 14b which is connected to the drive unit 11b. The first sun wheel P11b and the clutch element S21b of the second clutch unit S2b are connected in a rotationally fixed manner by means of a connection shaft 16b. The first hollow wheel P13b, the clutch element S42b of the fourth clutch unit S4b, the third sun wheel 31b and the fourth sun wheel P41b are connected in a rotationally fixed manner by means of a connection shaft 17b. The clutch element S32b of the third clutch unit S3b, the clutch element S11b of the first clutch unit S1b, the second planetary wheel carrier P22b and the clutch element S41b of the fourth clutch unit S4b are connected in a rotationally fixed manner by means of a connection shaft 18b. The first planetary wheel carrier P12b and the second hollow wheel P23b are connected in a rotationally fixed manner by means of a connection shaft 19b. The third hollow wheel P33b is directly connected to the clutch element S51b of the fifth clutch unit S5b in a rotationally fixed manner. The fourth hollow wheel P43b is directly connected to the clutch element S61b of the sixth clutch unit S6b in a rotationally fixed manner. The power output unit 12b is connected in a rotationally fixed manner to the third planetary wheel carrier P32b and the clutch element S62b of the sixth clutch unit S6b by means of a power output shaft 15b.

The drive shaft 14b, which is connected to the drive unit 11b, passes through the four sun wheels P11b, P21b, P31b, P41b. For the connection of the clutch element S31b, it is guided axially to the outside at the input side. The drive shaft 14b limits the transmission on the input side The second hollow wheel P23b is connected directly to the drive shaft 14b. For connecting the fourth planetary wheel carrier P42b, the drive shaft 14b is guided axially and radially between the fourth planetary gear unit P4b and the power output shaft 15b. The connection shaft 16b is guided radially to the outside on the axial input side from the first planetary gear unit P1b. The connection shaft 17b surrounds the second planetary gear unit P2b. It is guided radially and axially to the inside between the clutch unit S4b and the third planetary gear unit P3b and connected to the third sun wheel P31b and the fourth sun wheel P41b. The connection shaft 18a is guided radially and axially to the outside between the drive shaft 14b and the connection shaft 16b. It further passes through the first sun wheel P11b and is guided to the outside radially and axially between the planetary gear units P1b, P2b for connecting the second planetary wheel carrier P22b. For the connection of the clutch element S42b, it passes through the second planetary gear unit P2b and is guided radially and axially to the outside between the second planetary gear unit P2b and the connection shafts 17b. The connection shaft 19b is guided radially and axially to the outside between the first planetary gear unit P1b and the second planetary gear unit P2b for connecting the planetary wheel carrier P12b and the hollow wheel P23b. The power output shaft 15b is guided axially and radially to the outside between the third planetary gear unit P3b and the fourth planetary gear unit P4b. It surrounds the fourth planetary gear unit P4b and limits the transmission unit on the output side.

The forward transmission gears V1b-V9b are shifted by means of the clutch units S1b, S2b, S3b, S4b, S5b, S6b (see FIG. 6). The transmissions of the two embodiments are kinematically equivalent. The clutch unit S3b has a changed clutch compared to the previous embodiment, this is why the transmission gears V1b-V9b have changed power flows particularly with regard to a strain on the connection shafts 16b, 17b, 18b, 19b. A shift logic of the transmission unit is unchanged. Due to the changed standing transmission ratio of the planetary gear units P2b, P3b, P4b, the transmission gears V1b-V9b have different transmission ratios $1_1$b-$1_9$b. For shifting the forward transmission gears V2b, V3b, V5b, V6b, the second sun wheel P21b and the second planetary wheel carrier P22a can be connected in a rotationally fixed manner by means of the clutch unit S3b, whereby the second planetary gear unit P2b can be blocked by means of the clutch unit S3b.

The first forward transmission gear V1b has a transmission ratio $i_1$ b of 5.5536 between the drive unit 11b and the power output unit 12b in this embodiment. The first forward transmission gear V1b is formed by closing the clutch units S2b, S4b, S5b. The clutch unit S2b connects the first sun wheel P11b to the transmission housing 13b in a rotationally fixed manner. The clutch unit S4b connects the second planetary wheel carrier P22b to the first hollow wheel P13b and the third sun wheel P31b in a rotationally fixed manner. The clutch unit S5b connects the third hollow wheel P33b to the transmission housing 13b in a rotationally fixed manner. A power flow for the first unit gear V1b is introduced via the second planetary gear unit P2b and is split via the clutch unit S4b. A part of the power flow is fed back to the second planetary gear unit P2b via the first planetary gear unit P1b. A further part of the power flow is diverted via the third planetary gear unit P3b.

The second forward transmission gear V2b has a transmission ratio $i_2$b of 3.556 between the drive unit 11b and the power output unit 12b in this embodiment. The second forward transmission gear V2b is formed by closing the clutch units S3b, S4b, S5b. The clutch unit S3b connects the second planetary wheel carrier P22b to the second sun wheel P21b in a rotationally fixed manner. The clutch unit S4b connects the second planetary wheel carrier P22b to the third sun wheel P31b in a rotationally fixed manner. The clutch unit S6b connects the third hollow wheel P33b to the transmission housing 13b in a rotationally fixed manner. A power flow for the second forward transmission gear V2b is introduced via the second planetary gear unit P2b and is diverted via the third planetary gear unit P3b.

The third forward transmission gear V3b has a transmission ratio $i_3$b of 2.359 between the drive unit 11b and the power output unit 12b in this embodiment. The third forward transmission gear V3b is formed by closing the clutch units S2b, S3b, S5b. The clutch unit S2b connects the first sun wheel P11b to the transmission housing 13b in a rotationally fixed manner. The clutch unit S3b connects the second planetary wheel carrier P22b to the second sun wheel P21b in a rotationally fixed manner. The clutch unit S5b connects the third hollow wheel P33b to the transmission housing 13b in a rotationally fixed manner. A power flow for the third forward transmission gear V3b is introduced via the second planetary gear unit P2b, guided further via the first planetary gear unit P1b and is again diverted via the third planetary gear unit P3b.

The fourth forward transmission gear V4b has a transmission ratio $i_4$b of 1.701 between the drive unit 11b and the power output unit 12b in this embodiment. The fourth forward transmission gear V4b is formed by closing the clutch units S2b, S5b, S6b. The clutch unit S2b connects the first sun wheel P11b to the transmission housing 13b in a rotationally fixed manner. The clutch unit S5b connects the third hollow wheel P33b to the transmission housing 13b in a rotationally fixed manner. The clutch unit S6b connects the fourth hollow wheel P43b to the power output unit 12b in a rotationally fixed manner. A power flow for the fourth forward transmission gear V4b is introduced via the fourth planetary gear unit P4b and is split via the clutch unit S6b. A part of the power flow is fed back to the fourth planetary gear unit P4b via the third planetary gear unit P3b. A further part of the power flow is diverted directly.

The fifth forward transmission gear V5b has a transmission ratio $i_5$b of 1.238 between the drive unit 11b and the power output unit 12b in this embodiment. The fifth forward transmission gear V5b is formed by closing the clutch units S2b, S3b, S6b. The clutch unit S2b connects the first sun wheel P11b to the transmission housing 13b in a rotationally fixed manner. The clutch unit S3b connects the second planetary wheel carrier P22b to the second sun wheel P21b in a rotationally fixed manner. The clutch unit S6b connects the fourth hollow wheel P43b to the power output unit 12b in a rotationally fixed manner. A power flow for the fifth forward transmission gear V6b is split by means of the drive shaft 11b. A part of the power flow is diverted directly via the fourth planetary gear unit P4b, a further part is fed back to the drive unit 11b via the blocked second planetary gear unit P2b. A part of the power flow guided via the fourth planetary gear unit P4b is also guided to the second planetary gear unit P2b via the first planetary gear unit P1b.

The sixth forward transmission gear V6b has a transmission ratio $i_3$b of 1.000 between the drive unit 11b and the power output unit 12b in this embodiment. It is formed as a direct gear. The sixth forward transmission gear V6b is formed by closing the clutch units S3b, S4b, S6b. The clutch unit S3b connects the second planetary wheel carrier P22b to the fourth sun wheel P41b in a rotationally fixed manner. The clutch unit S4b connects the second planetary wheel carrier P22b to the fourth sun wheel P41b in a rotationally fixed manner. The clutch unit S6b connects the fourth hollow wheel P43b to the power output unit 12b in a rotationally fixed manner. A power flow for the sixth forward transmission gear V6b is introduced via the fourth planetary gear unit P4b and is split. A part of the power flow is fed back to the drive unit 11b via the second planetary gear unit P2b. A further part of the power flow is diverted again via the fourth planetary gear unit P4b.

The seventh forward transmission gear V7b has a transmission ratio $i_7b$ of 0.881 between the drive unit 11b and the power output unit 12b in this embodiment. The seventh forward transmission gear V7b is formed by closing the clutch units S2b, S4b, S6b. The clutch unit S2b connects the first sun wheel P11b to the transmission housing 13b in a rotationally fixed manner. The clutch unit S4b connects the second planetary wheel carrier P22b to the fourth sun wheel P41b in a rotationally fixed manner. The clutch unit S6b connects the fourth hollow wheel P43b to the power output unit 12b in a rotationally fixed manner. A power flow for the seventh forward transmission gear V7b is introduced via the fourth planetary gear unit P4b and is split. A part of the power flow is fed back to the drive unit 11b via the second planetary gear unit P2b and the first planetary gear unit P1b. A further part of the power flow is diverted via the fourth planetary gear unit P4b.

The eighth forward transmission gear V8b has a transmission ratio $i_8b$ of 0.726 between the drive unit 11b and the power output unit 12b in this embodiment. The eighth forward transmission gear V8b is formed by closing the clutch units S1b, S4b, S6b. The clutch unit S1b connects the second planetary wheel carrier P22b to the transmission housing 13b in a rotationally fixed manner. The clutch unit S4b connects the fourth sun wheel P41b to the second planetary wheel carrier P22b and thus to the transmission housing 13b in a rotationally fixed manner. The clutch unit S6b connects the fourth hollow wheel P43b to the drive unit in a rotationally fixed manner. A power flow for the eighth forward transmission gear V8b is introduced and diverted via the fourth planetary gear unit P4b.

The ninth forward transmission gear V9b has a transmission ratio $i_9b$ of 0.580 between the drive unit 11b and the power output unit 12b in this embodiment. The ninth forward transmission gear V9b is formed by closing the clutch units S1b, S2b, S5b. The clutch unit S1b connects the second planetary wheel carrier P22b to the transmission housing 13b in a rotationally fixed manner. The clutch unit S2b connects the fourth hollow wheel P43b to the drive unit 12b in a rotationally fixed manner. A power flow for the ninth forward transmission gear V9b introduced via the drive unit 11b is split in front of the first planetary gear unit P1b. A first part of the power flow is guided to the fourth planetary gear unit P4b via the second planetary gear unit P2b and the first planetary gear unit P1b. A second part of the power flow is directly guided to the fourth planetary gear unit P4b. The power flow is combined again and diverted by means of the fourth planetary gear unit P4b.

The reverse transmission gear R1b has a transmission ratio $i_Rb$ of −3.901 between the drive unit 11b and the power output unit in this embodiment. The reverse transmission gear R1b is formed by closing the clutch units S1b, S2b, S5b. The clutch unit S1b connects the second planetary wheel carrier P22b to the transmission housing 13b in a rotationally fixed manner. The clutch unit S2b connects the first sun wheel P11b to the transmission housing 13b in a rotationally fixed manner. The clutch unit S5b connects the third hollow wheel P33b to the transmission housing 13b in a rotationally fixed manner. A power flow for the reverse transmission gear R1b is introduced via the second planetary gear unit P2b, guided to the third planetary gear unit P3b via the first planetary gear unit P1b and is diverted again via the third planetary gear unit P3.

A progressive ratio $\phi_{1/2}b$ between the first and the second forward transmission gear V1b V1b, V2b is 1.557. A progressive ratio $\phi_{2/3}b$ between the second and the third forward transmission gear V2b, V3b is 1.508. A progressive ratio $\phi_{3/4}b$ between the third and the fourth forward transmission gear V3b, V4b is 1.386. A progressive ratio $\phi_{4/5}b$ between the fourth and the fifth forward transmission gear V4b, V5b is 1.375. A progressive ratio $\phi_{5/6}b$ between the fifth and the sixth forward transmission gear V5b, V6b is 1.238. A progressive ratio $\phi_{6/7}b$ between the sixth and the seventh forward transmission gear V6b, V7b is 1.135. A progressive ratio $\phi_{7/8}b$ between the seventh and the eighth forward transmission gear V7b, V8b is 1.214. A progressive $\phi_{8/9}b$ ratio between the eighth and the ninth forward transmission gear V8b, V9b is 1.250. A total spread of the transmission unit between the first forward transmission gear V1b and the ninth forward transmission gear V9b is about 9.5. A spread between the first forward transmission gear V1b and the eighth forward transmission gear V8b is about 7.6. A spread between the second forward transmission gear V2b and the ninth forward transmission gear V9b is about 6.1. The transmission unit can basically also be used as an eight gear transmission.

What is claimed is:

1. A transmission unit, having in a transmission housing (13a, 13b), a first, a second, a third, and a fourth planetary gear unit (P1a, P2a, P3a, P4a; P1b, P2b, P3b, P4b) disposed along a main axis of rotation (10a; 10b) and including first, second, third and fourth respective sun gears (P11a, P21a, P31a, P41a, P11b, P21b, P31b, P41b) and respective first, second, third and fourth planetary gear carriers(P12a, P22a, P32a, P42a, P12b, P22b, P32b, P42b), with the first planetary wheel carrier (P12a ; P12b) and a second hollow wheel (P23a ; P23b ), being connected to each other in a rotationally fixed manner and with six clutch units (S1a, S2a, S3a, S4a, S5a, S6a; S1b, S2b, S3b, S4b, S5b, S6b) allowing for nine forward gears (V1a-V9a; V1b-V9b) to be engaged, with a drive unit (11a; 11b) rotationally fixedly connected to the second sun gear (P21a; P21b) of the second planetary gear units (P2a; P2b) and the fourth planetary wheel carrier (P42a; P42b) of the fourth planetary gear unit (P4a; P4b), and having a power output unit (12a; 12b) rotationally fixedly connected to the third planetary wheel carrier (P32a; P32b) of the third planetary gear transmission (P3a; P3b).

2. The transmission unit according to claim 1, wherein a clutch element (S61a; S61b) of the hollow gear (43a )of the fourth planetary gear unit (P4a, P4b) is connected to the power output unit (12a; 12b) in a rotationally fixed manner.

3. The transmission unit according to claim 2, wherein the planetary gear units include respective first, second, third and fourth hollow wheels and the fourth hollow wheel (P43a; P43b) and a clutch element (S62a; S62b) are connected to each other in a rotationally fixed manner.

4. The transmission unit according to claim 2, wherein one of the clutch units (S6a; S6b) is provided to connect, in a rotationally fixed manner, the clutch element (S61a; S61b) which is connected to the power output unit (12a; 12b) in a rotationally fixed manner and the clutch element (S62a; S62b) which is connected to the fourth hollow wheel (P43a; P43b) in a rotationally fixed manner.

5. The transmission unit according to claim 3, wherein the third hollow wheel (P33a; P33b) and a clutch element (S51a; S51b) are connected to each other in a rotationally fixed manner.

6. The transmission unit according to claim 5, wherein one of the clutch units (S5a; S5b) is provided to connect, in a rotationally fixed manner, the clutch element (S51a; S51b) connected to the third hollow wheel (P33a; P33b) in a rotationally fixed manner to the transmission housing (13a; 13b).

7. The transmission unit according to claim 1, wherein a first hollow wheel (P13a; P13b), a clutch element (S42a; S42b), a third sun wheel (P31a; P31b) and a fourth sun wheel (P41a; P41b), are all interconnected in a rotationally fixed manner.

8. The transmission unit according to claim 1, wherein three clutch elements (S11a, S32a, S41a; S11b, S32b, S43b) and a second planetary wheel carrier (P22a; P22b), are all interconnected to each other in a rotationally fixed manner.

9. The transmission unit according to claims 7, wherein one of the clutch units (S4a; S4b) is provided to connect in a rotationally fixed manner one of the clutch elements (S41a; S41b) connected to the second planetary wheel carrier (P22a; P22b) in a rotationally fixed manner and the clutch element (S42a; S42b) connected to the first hollow wheel (P13a; P13b) in a rotationally fixed manner.

10. The transmission unit at least according to claim 8, wherein one of the of the clutch units (S1a; S1b) is provided to connect in a rotationally fixed manner one of the clutch elements (S11a; S11b) connected to the second planetary wheel carrier (P22a; P22b) in a rotationally fixed manner to the transmission housing (13a).

11. The transmission unit according to claim 1, wherein a first sun wheel (P11a; P11b) and a clutch element (S21a; S21b) are connected to each other in a rotationally fixed manner.

12. The transmission unit according to claim 11, wherein one of the clutch units (S2a; S2b) is provided to connect in a rotationally fixed manner the clutch element (S21a; S21b) connected to the first sun wheel (P11a; P11b) in a rotationally fixed manner to the transmission housing (13a; 13b).

13. The transmission unit according to claim 1, wherein a clutch element (S31a; S31b) is connected to one of the second hollow wheel (P23a) and the second sun wheel (P21b) in a rotationally fixed manner.

14. The transmission unit according to claim 13, wherein one of the clutch units (S3a, S3b) is provided to connect in a rotationally fixed manner one of the clutch elements (S32a, S32b) connected in a rotationally fixed manner to the second planetary wheel carrier (P22a; P22b) and the clutch element (S31a; S31b) connected in a rotationally fixed manner to the hollow wheel (P23a) or the second sun wheel (P21b).

* * * * *